United States Patent [19]

Kamens

[11] Patent Number: 4,460,714

[45] Date of Patent: Jul. 17, 1984

[54] UNSATURATED POLYESTER RESIN FOAMS USING INORGANIC IRON SALTS

[75] Inventor: Ernest R. Kamens, Tonawanda, N.Y.

[73] Assignee: Pennwalt Corporation, Philadelphia, Pa.

[21] Appl. No.: 557,076

[22] Filed: Dec. 1, 1983

[51] Int. Cl.³ .............................................. C08J 9/02
[52] U.S. Cl. ................................. 521/122; 521/124; 521/137; 521/138
[58] Field of Search ............... 521/122, 124, 137, 138

[56] References Cited

U.S. PATENT DOCUMENTS 4,216,294  8/1980  Halle et al. ......................... 521/138

*Primary Examiner*—Morton Foelak

[57] ABSTRACT

Low density polyester resin foams are prepared at ambient temperatures from an admixture of an unsaturated polyester resin, an organic isocyanate compound, a peroxide curing agent system, a surfactant, and an accelerator whereby the foaming efficiency of this admixture is improved by adding small amounts of an inorganic iron salt.

8 Claims, No Drawings

UNSATURATED POLYESTER RESIN FOAMS USING INORGANIC IRON SALTS

BACKGROUND OF THE INVENTION

This invention relates to an improved process for producing cellular structures or foams of unsaturated polyester resins.

Known prior methods for producing unsaturated polyester resin foams are described in U.S. Pat. No. 4,216,294 which discloses mixing a curable liquid unsaturated curable polyester resin with an organic isocyanate compound together with a suitable surfactant, and accelerator and a particular combination of peroxide curing agents. Various cobalt salts are used as primary accelerators while copper or manganese salts or vanadium, lithium, iron carboxylates are used as secondary promoters.

The present application is an improvement over U.S. Pat. No. 4,216,294 which is herein incorporated by reference.

SUMMARY OF THE INVENTION

This invention is directed to a foamable and curable liquid composition for producing low density foams comprised of an admixture of an unsaturated polyester resin, an organic isocyanate compound, silicone surfactant, an organic peroxide curing agent system, and a cobalt salt accelerator. The improvement of this invention resides in adding an inorganic iron salt (as a secondary accelerator) such as ferric and ferrous chlorides, nitrates, and sulfates, either alone or in combination with each other in order to improve the efficiency of the foaming and curing reaction and to prevent cracking and splitting of the foamed and cured product.

DETAILED DESCRIPTION OF THE INVENTION

It has been discovered that the foaming efficiency of an admixture of an unsaturated polyester resin, an organic isocyanate, an organic peroxide, and an organic cobalt salt can be greatly improved by using small amounts of inorganic iron salts, preferably ferrous and ferric chlorides, nitrates, and sulfates either alone or in combination. In addition to making lower density foams possible, the use of these iron salts make it possible to prepare foams in thick sections without cracking or splitting. A further advantage of the present improved process is that standard commercial initiators can be used which were not very efficient in the prior processes.

The primary accelerators of this invention are the standard accelerators such as the various cobalt salts, such as cobalt neodecanoate, which should be present in the composition at about 0.001 to 0.20 parts per 100 parts of resin (phr), but more typical 0.01 to 0.10 phr based on actual metal content.

The secondary accelerators of this invention are the inorganic iron salts which include such salts as ferric and ferrous chlorides, nitrates, and sulfates either alone or in combination with each other. These salts are generally present at a concentration from about 0.01 to about 0.5, preferably from about 0.03 to about 0.3, parts of iron per 100 parts of resin.

The liquid unsaturated polyester resins useful in this invention include a broad class of linear or branched polyesters, typically prepared as a condensation or reaction product of an unsaturated polybasic acid and a polyhydric compound. For example, the condensation product of an unsaturated dibasic acid of alpha-beta ethylenic unsaturation and di- or trihydric compounds, such as a glycol. Often a saturated polybasic acid or anhydride, such as a dibasic acid, is employed with the unsaturated acid or anhydride to modify the reactivity of the unsaturated resin. The resin then is dissolved in a monomer having an unsaturated double bond which is copolymerizable with alpha, beta-unsaturated double bonds of the polyester resin. To such solutions are usually added a polymerization inhibiting agent or mixtures thereof.

Typical saturated polybasic acids are the dibasic acids including phthalic acids, iso- and terephthalic acids, adipic acid, succinic acid, sebacic acid and the like. Typical unsaturated dibasic acids are maleic acid, fumaric acid, citaconic acid, chloromaleic acid, allylsuccinic acid, itaconic acid, mesaconic acid, and others as well as their anhydrides. Examples of saturated or unsaturated polyalcohols are ethylene glycol, diethylene glycol, triethylene glycol, propylene glycol, dipropylene glycol, glycerol,2-butyn-1,4 diol, neopentyl glycol, 1,2-propanediol, pentaerythritol, mannitol, 1,6 hexanediol, 1,3-butylene glycol, 2-buten-1,4-diol and the like. Fire retardant raw materials for polyester resins which may be used are tetrachloro phthalic anhydride, tetrabromo phthalic anhydride, dibromo- tetra hydrophthalic anhydride, chlorendic acid, tetrabromobisphenol A, and dibromo neopentyl glycol.

Typical unsaturated vinyl monomers or oligomers copolymerizable with the unsaturated polyester resins are styrene, vinyl toluene, methyl methacrylate, diallyl phthalate, t-butyl styrene, chlorostyrene (promotes fire retardancy), divinyl benzene, methyl styrene, methyl acrylate, triallyl cyanurate, dibutyl fumarate, n-butyl methacrylate, and others, as well as mixtures thereof. Typical inhibitors used in unsaturated polyester resin solutions are hydroquinone, p-benzoquinone, mono-t-butylhydroquinone, 2,5-diphenyl-p-benzoquinone, t-butyl-catechol, toluhydroquinone, toluquinone, hydroquinone monomethyl ether, and others.

The isocyanate compounds useful in this invention include compounds containing one or more isocyanate groups, —NCO. Poly functional isocyanates, containing two or three isocyanate groups are particularly useful. For the purposes of this invention most diisocyanates are suitable. However, it has been found that for optimum control of properties, the more ideal compounds are the prepolymers of common diisocyanates. These isocyanate compounds have been particularly effective in the formulation when present in concentrations no greater than about 15% by weight.

Some of the useful isocyanate compounds are 2,4-toluene diisocyanate, mixtures of 2,4- and 2,6-toluene diisocyanate, (TDI), and the modified or prepolymer forms of these compounds. Also useful are diphenylmethane-4,4'-diisocyanate (MDI), and polymethylene polyphenyl isocyanate (PMPPI). Others include octadecyl isocyanate, cyclohexyl isocyanate, dianisidine diisocyanate, metaphenylene diisocyanate, phenyl isocyanate, o-, m, and p-chlorophenyl isocyanate, methylene bis (4-phenyl isocyanate), isophrone diisocyanate, trimethyl hexamethylene diisocyanate. These isocyanates, diisocyanates, and polymeric organic isocyanates are used in concentrations of at least about 5% by weight of resin, usually about 5 to 15% by weight of resin and preferably about 8 to 12% by weight of the resin.

Peroxides which are useful in the present invention include those that lead to the release of gaseous decomposition products and simultaneously produce free radicals to initiate the crosslinking and curing of the polyester resin at ambient temperatures. The preferred peroxides are solutions of ketone peroxides such as for example methyl ethyl ketone peroxide. These peroxides provide low density foams without requiring the addition of hydrogen peroxide. This is an advantage over prior art processes which require relatively high concentrations of hydrogen peroxide in combination with other peroxides to obtain efficient foaming reaction. Hydrogen peroxide is a strong oxidizing agent and even relatively dilute solutions can be hazardous to handle. Dilute solutions of methyl ethyl ketone (MEK) peroxides generally contain low concentrations of hydrogen peroxide, usually less than 10% by weight, and are therefore relatively safer to handle. These preferred MEK peroxides give rapid foaming and curing and result in foams with excellent physical properties over a wide density range.

In addition to the preferred MEK peroxides, the present invention may include, for example, in combination with hydrogen peroxide secondary initiators such as (i) diacyl peroxides, e.g., benzoyl peroxide, (ii) peroxyesters, e.g., t-butyl peroxybenzoate, t-amyl peroxyoctoate and 2,5-dimethyl 2,5-diperoxyoctoate, (iii) hydroperoxides, e.g., cumene hydroperoxide or t-butyl hydroperoxide, and (iv) peroxydicarbonates; all are commercial products.

In practicing the process of this invention the concentration of total peroxide will generally be in the range of 0.5 to 5.0 (active basis), preferably 1.0 to 3.0 parts, peroxide per 100 parts by weight of polyester resin.

The silicone surfactant found to be useful in this invention to ensure entrapment and uniform dispersion of gaseous by-products include the silicone-oxyalkylene block copolymers that fall into two classes, depending upon the nature of the linking group between the organosiloxane and the oxyalkylene portion of the molecule. Thus, the silicone surfactants are characterized as hydrolyzable where the moieties are joined by a silicone-oxygen-carbon bond and non-hydrolyzable where the bond is silicone-carbon (see, for example U.S. Pat. No. 3,779,774). Concentrations in the amount of about 1% by weight have been found satisfactory, with a practical useful range being about 0.5-1.5% by weight.

This invention may be used to produce many new and useful products. Rigid or semi rigid foam structures thus formed from polyester resin will be relatively inexpensive, have good stiffness to weight ratios, exhibit thermal and sound insulation properties and be resistant to heat and many chemicals. These properties are particularly desirable in many applications such as boats, sanitary plumbing fixtures, building panels, automotive parts and recreation components. In many of these applications the good adhesive properties of the polyester foam are especially desirable for maximizing performance of the product.

EXAMPLES

The following examples are provided to illustrate the preferred embodiments of the invention and are not intended to restrict the scope thereof. All parts are by weight and all percentages are expressed as weight percentages unless otherwise indicated.

EXAMPLE 1

This example illustrates the improvement obtained from the use of a small concentration of ferric chloride as a secondary accelerator in combination with the primary accelerator, cobalt neodecanoate. In the presence of ferric chloride foam density is significantly decreased, i.e. greater foaming efficiency, and the foams do not crack or split. Also illustrated is the fact that copper naphthenate, a secondary promoter of the prior art, is not as effective as ferric chloride.

| Resin[1] | 90 | 90 | 90 | 90 | 90 |
|---|---|---|---|---|---|
| Toluene diisocyanate[2] | 10 | 10 | 10 | 10 | 10 |
| 45% Aqueous FeCl$_3$ | — | — | 0.6 | — | 0.6 |
| 6% Cobalt neodecanoate | 0.5 | 0.5 | 0.5 | 0.5 | 0.5 |
| 8% Copper napthenate | — | 0.10 | — | — | — |
| Lupersol DDM-9[3] | 3 | 3 | 3 | — | — |
| Lupersol DSW-9[4] | — | — | — | 3 | 3 |
| gel time, minutes | 2.7 | 2.5 | 5.5 | 2.7 | 9.2 |
| resulting density, lb/ft$^3$ | 50 | 55 | 17 | 29 | 10 |
| cracks, splitting of foam | yes | yes | no | yes | no |

[1]Laminac 4123 (an unsaturated polyester resin) with 1% Dow Corning 193 Surfactant (a silicone)
[2]80% Toluene-2,4-diisocyanate
 20% Toluene-2,6-diisocyanate
[3]MEK Peroxide solution containing an average of .75% of $H_2O_2$
[4]MEK Peroxide solution containing about 5% of $H_2O_2$

EXAMPLE 2

This example illustrates the variety of iron compounds that are effective in the process of the present invention. These compounds in combination with cobalt provide significantly lower foam densities. Also illustrated is the fact that organic salts of iron are not effective in comparison to the inorganic salts for improving foaming efficiency.

| Formulation Component | Grams |
|---|---|
| Resin[1] | 90 |
| Toluenediisocyanate | 10 |
| 6% Cobalt neodecanoate | 0.5 |
| Lupersol DDM-9 | 3 |
| Iron Compound | (as given below) |

| Iron Compound | Equivalent Parts Iron | Gel Time Minutes | Density Lb/Ft$^3$ |
|---|---|---|---|
| None (Control) | — | 2.7 | 50 |
| Iron napthenate | 0.090 | 2.1 | 52 |
| Iron octoate | 0.090 | 2.7 | 47 |
| Ferric chloride | 0.090 | 5.5 | 17 |
| Ferrous chloride | 0.090 | 4.0 | 30 |
| Ferric nitrate | 0.090 | 4.5 | 23 |
| Ferric ammonium sulfate | 0.045 | 4.0 | 34 |
| Ferric sulfate | 0.045 | 10.0 | 24 |
| Ferrous sulfate | 0.090 | 6.3 | 21 |

[1]Laminac 4123 (an unsaturated polyester resin) with 1% Dow Corning 193 Surfactant (a silicone)

EXAMPLE 3

This example illustrates the use of a combination of inorganic iron salts.

| Resin[1] | 90 |
|---|---|
| Toluene diisocyanate | 10 |
| 6% Cobalt neodecanoate | 0.5 |
| 45% Aqueous ferric chloride | 0.75 |
| 20% Aqueous ferrous sulfate | 0.75 |
| Luperson DDM-9 | 3 |
| Gel time, minutes | 4.7 |

| -continued | |
|---|---|
| Foam density, lb/ft³ | 21 |

(1)Laminac 4123 (an unsaturated polyester resin) with 1% Dow Corning 193 Surfactant (a silicone)

What is claimed is:

1. In a foamable and curable liquid composition for producing low density foams comprised of an admixture of an unsaturated polyester resin, an organic isocyanate compound, a silicone surfactant, an organic peroxide curing agent system, and a cobalt salt accelerator, the improvement comprising adding to this composition a sufficient amount of at least one inorganic iron salt as a secondary accelerator in order to improve the efficiency of the foaming and curing reaction and to prevent cracking and splitting of the foamed and cured product.

2. The composition of claim 1 wherein the inorganic iron salt is selected from the class consisting of ferric and ferrous chlorides nitrates, sulfates and mixtures thereof.

3. The composition of claim 2 wherein the inorganic iron salt is ferric chloride.

4. The composition of claim 2 wherein the inorganic iron salt is a mixture of ferric chloride and ferrous sulfate.

5. The composition of claim 1 wherein the polyester resin is in solution with a vinyl monomer.

6. The composition of claim 1 wherein the organic peroxide curing agent system is methyl ethyl ketone peroxide containing less than 10% by weight of hydrogen peroxide.

7. The composition of claim 1 wherein the organic peroxide curing agent system is hydrogen peroxide combined with a peroxide selected from the class consisting of a diacyl peroxide, peroxyester, hydroperoxide, and peroxydicarbonate.

8. A method for making a foam product having a low density comprising mixing together at ambient temperature the composition of claim 1 and allowing said composition to be expanded, crosslinked and cured by said curing and foaming agent.

* * * * *